United States Patent [19]

Johnson, III et al.

[11] 4,171,882
[45] Oct. 23, 1979

[54] LIGHT REFLECTIVE PROJECTION SYSTEM

[76] Inventors: Eugene Johnson, III, 816 14th St., Waynesboro, Va. 22980; Dane J. Hansen, 1525 Carlin La., McLean, Va. 22101

[21] Appl. No.: 911,539

[22] Filed: Jun. 1, 1978

[51] Int. Cl.$^2$ .................. G03B 21/00; A63J 17/00
[52] U.S. Cl. ................................... 353/1; 40/433; 84/464 R; 353/16
[58] Field of Search .............. 353/16, 19, 1; 274/1 K, 274/9 A, 2, 39 A; 40/431, 433, 456; 84/464

[56] References Cited

U.S. PATENT DOCUMENTS

| 1,804,453 | 5/1931 | Basseches | 274/1 K |
| 2,561,971 | 7/1951 | Bustanoby | 353/16 |
| 2,563,546 | 8/1951 | Mullaney | 274/9 A |
| 3,343,453 | 9/1967 | Butterfield | 84/464 |
| 3,801,186 | 4/1974 | Dian | 40/433 |

Primary Examiner—Steven L. Stephan
Attorney, Agent, or Firm—Frederick L. Bergert

[57] ABSTRACT

A light reflective projection system is disclosed. The system includes a combination of a light source, at least one reflective or transparent disc having means for rotation thereof and a lens. In one embodiment, disc rotation is provided by the rotatable turntable of a record player. In this embodiment, the reflective or transparent discs may be carried by a record mounted on the record player, by a pedestal member mounted over the spindle of the record player, or by a differential speed ring having drive wheels which bear upon and are rotated by the label portion of the rotating record. A stationary support provides a location for an additional disc. The light source and lens are so mounted that light rays from the light source are projected downwardly through or onto one or more of the transparent or reflective rotating discs, then upwardly through the lens for projection upon the viewing surface.

6 Claims, 12 Drawing Figures

EDGE OF 33 ⅓ RPM DISC MEDIA
EDGE OF PEDESTAL BASE

LIGHT REFLECTIVE PROJECTION SYSTEM

BACKGROUND AND SUMMARY OF THE INVENTION

The present invention relates to a light reflective projection system. More particularly, the present invention relates to a light reflective projection system which is capable of producing high resolution colored, dynamic imagery.

Previous apparatus for use in projecting light so as to form images on a screen or other surface have included such apparatus as described, for example, in U.S. Pat. Nos. 2,587,433 to Bentley et al., 3,343,453 to Butterfield and 1,913,913 to Boularan et al. The Bentley et al. patent discloses a phonograph apparatus in which a series of small pictures are provided in the central portion of the record, with a picture-projecting mechanism located either above or below the record, and with means for projecting each picture onto a screen and holding the picture stationary for a predetermined number of revolutions of the record. The Butterfield patent is concerned with a picture-sound projector in which a phonograph record has the sound track on one side and a series of pictures or images on the other side, with means for projecting the pictures or images so that several images are flashed on the screen at the same time. The Boularan et al. device is concerned with a record which is made of a transparent material and having a series of images thereon separated by opaque spaces. The sound recording is carried by the center portion of the record. Other similar devices are described in U.S. Pat. Nos. 2,455,712 and 3,885,797.

By The present invention, there is provided an improved light reflective projection system which is capable of producing high resolution, dynamic images in color. The present system is relatively easy to construct, compared with prior art systems. Furthermore, the present system is highly adaptable so that various pictures, images and the like may be projected onto any of various projection surfaces to provide the desired effect.

The light reflective projection system of the present invention includes a vertically mounted rod having a light source, a lens and a differential speed ring mounted thereon. A support base having a rotatable portion is also provided. The differential speed ring member has its center in axial alignment with the axis of the rotatable portion and includes a plurality of radially extending stepping wheel devices. Each stepping wheel device includes an upright, rotatable drive wheel which rests upon the rotatable portion of the base. At least one step-down wheel is concentrically aligned with each drive wheel on the inner side thereof toward the axis of the speed ring. The upper surfaces of the step-down wheels provide a support for transparent or reflective discs which rotate through the action of the drive wheels. Other similar discs may be carried by a pedestal member mounted over the axis of rotation of the rotatable portion, or by the rotatable portion itself or by a stationary support member mounted on the arm of the differential speed ring.

The light source and lens are so mounted relative to the rotatable base portion that light rays from the light source are projected downwardly through or onto one or more of the transparent or reflective discs, thence upwardly through the lens and finally projected upon the viewing surface. In one embodiment, the rotatable base portion is the rotatable turntable of a record player and the drive wheels rest on the label portion of the rotating phonograph record.

BRIEF DESCRIPTION OF THE DRAWINGS

The advantages and features of the light reflective projection system of the present invention will be more fully understood from the following description of the preferred embodiments, taken in conjunction with the accompanying drawings, wherein.

DESCRIPTION OF THE PREFERRED EMBODIMENTS

Figure 1:
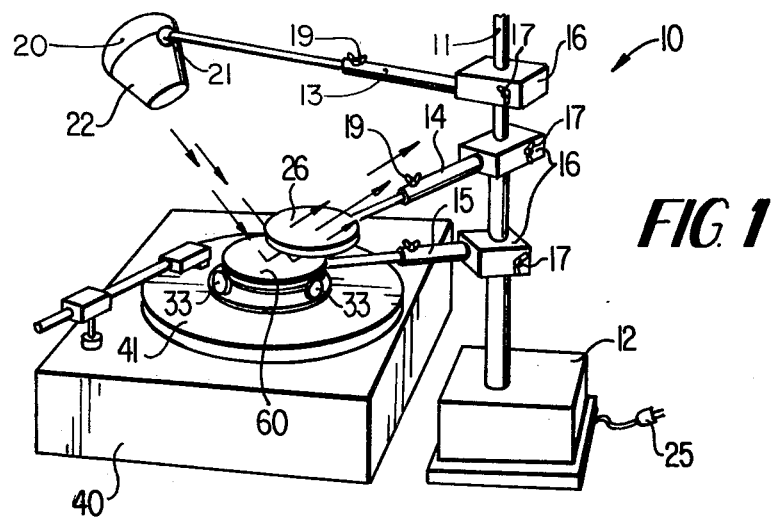
FIG. 1 is a perspective view of the light reflective projection system of the present invention.
Figure 2:
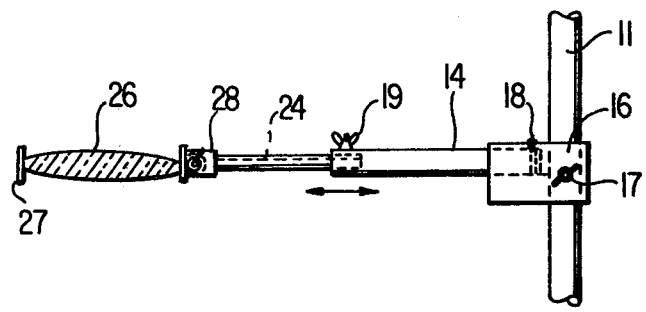
FIG. 2 is a side elevation of the lens arm employed in the system of FIG. 1.
Figure 3:
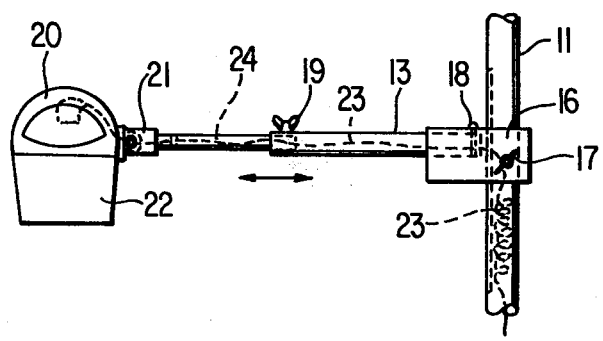
FIG. 3 is a side elevation of the light arm employed in the system of FIG. 1.

In the embodiment of the present invention as illustrated in FIGS. 1 through 6, there is provided a light reflective projection system 10 which includes a vertical tubular column 11 which is supported at its lower end by a base portion 12. Separately attached to the column 11 so as to be slidably movable along the vertical length thereof are a light arm 13, a lens arm 14 and a differential speed ring arm 15. Each of the members 13, 14 and 15 is attached to the column 11 by a clamp 16 provided with a conventional threaded bolt 17 which engages the column 11 upon being tightened to secure the respective member 13, 14, 15 at the desired height. Each of the arms 13, 14, 15 is attached to its respective clamp 16 by conventional means such as a pin 18 passing through the inner end of each arm 13, 14, 15 which is received within an opening provided for this purpose in each clamp 16. Each of the arms 13, 14, 15 is also provided in longitudinal sections as shown in FIGS. 1, 2 and 3, to allow the length of the arms 13, 14, 15 to be varied by the use of means such as a conventional wing nut and bolt arrangement 19 as shown. A channel 24 is provided in the outer section of the arms 13, 14, 15 for keying and locking the outer section by the use of the wing nut and bolt 19. The column 11 and arms 13, 14, 15 may be constructed of a metal such as aluminum, for example, or a durable plastic material.

At the other end of the light arm 13, as shown in FIG. 3, there is provided a light source 20 connected to the light arm 13 by a universal joint 21 which allows full attitudinal adjustment of the light 20 in three planes. A circular screen 22 may be attached around the periphery of the light source 20 so as to direct the main portion of the light rays in a downward direction. The light source 20 may be any of the high intensity light sources which are known in the art, such as a semi-sealed or collimated light source having a light bulb diameter of, for example, about 1½ to 3 inches. The light arm 13 as well as the vertical column 11 may be of tubular construction to allow the electrical wiring 23 for the light source 20 to be stored inside, and with the wiring 23 being coiled within the column 11 to allow vertical and horizontal adjustment of the light source 20 without exposing or bunching of the wires 23. The wiring 23 extends from the column 11 through the base 12 to a connection with a plug attachment 25 for attachment to a suitable source of electric current.

The lens arm 14 is provided at its outer end with a lens 26 contained within a lens support ring 27, as shown in FIG. 2. The support ring 27 is connected to the lens arm 14 by a universal joint 28 to allow full attitudinal adjustment of the lens 26 in three planes. The lens 26 may be any suitable condenser lens, either a single lens or multiple lens unit, which will allow light to pass through for projection upon the viewing surface.

Figure 4:
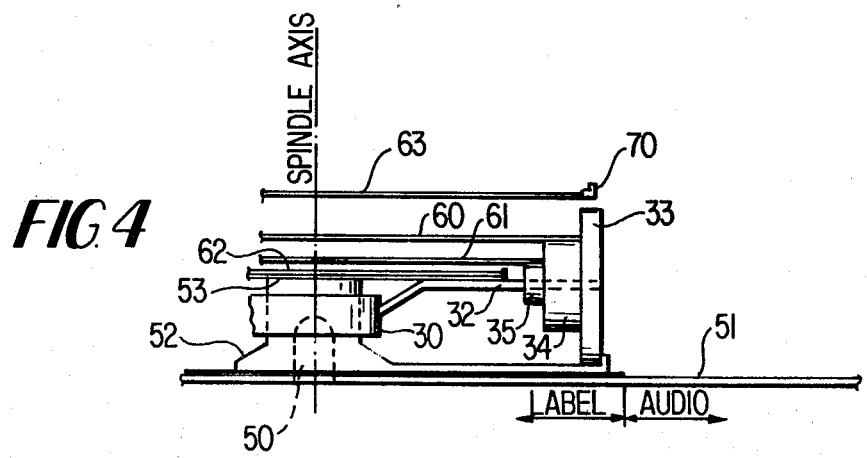
FIG. 4 is an elevational view in partial cross-section of a portion of the differential speed ring employed in the system of FIG. 1.
Figure 5:
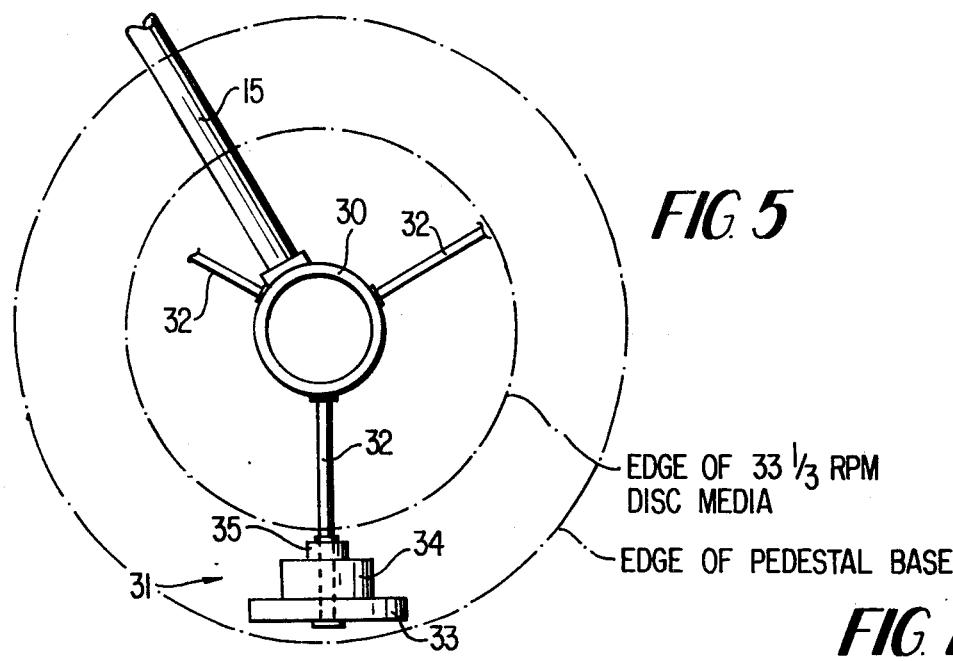
FIG. 5 is a partial plan view of the differential speed ring of FIG. 4.

As shown in detail in FIGS. 4 and 5, the differential speed ring arm 15 is provided at its outer end with a collar member 30 which is attached to the arm 15 by any conventional means such as welding or the use of adhesive sealing materials. Attached to and extending radially outwardly in a horizontal direction from the collar member 30 are a plurality of stepping wheel devices 31, each of which is connected to the collar 30 through an axle 32, the inner end of which is secured to the collar 30 by means such as welding or adhesive sealing materials. The collar 30 and axles 32 should be of a lightweight material, such as aluminum or aluminum alloy. Lightweight, durable plastic materials may also be employed.

At the outer end of each axle 32, there is rotatably mounted a drive wheel 33, each of said drive wheels 33 being in a vertical plane perpendicular to the respective axle 32. Mounted on the axle 32 interiorly of each drive wheel 33 and rotatable therewith are a pair of step-down wheels 34, 35 which are also vertically oriented. The diameter of the innermost step-down wheel 35 is less than that of the wheel 34 adjacent the drive wheel 33. As examples of the sizes of the wheels 33, 34, 35, each drive wheel 33 may have a diameter of about 1½ to 2 inches, while the step-down wheel 34 has a diameter of about ¾ to ⅞ inches and the innermost step-down wheel 35 has a diameter of about ½ to ⅝ inches. The wheels 33, 34, 35 may be made of plastic or a lightweight plastic material, for example, with the drive wheel 33 having a thickness of about ⅛ inch, for example, while the wheel 34 has a thickness of about ¼ inch and the wheel 35 has a thickness of about ⅛ inch. In one embodiment, three of the stepping wheel devices 31 were employed, with the three axles 32 being spaced equidistant apart at angles of 120 degrees.

Referring to FIG. 1, there is shown a support base 40 which carries a rotatable center portion 41. The base 40 is shown in FIG. 1 as a record player with rotatable turntable 41, but other support base configurations having a rotatable portion may also be employed. In addition, it is also within the scope of the present invention to position the column 11 directly on the base 40 which supports the rotatable portion 41, rather than employing a separate base 12 for the column 11.

As shown in FIGS. 1 and 2, the differential speed ring arm 15 is positioned so that the collar 30 is directly above and axially aligned with the spindle 50 of the turntable 41, and with the axles 32 being of a length such that the drive wheels 33 rest on the phonograph record 51 within the record label area in the center portion of the record 51. Since the label portion of a standard phonograph record is 4 inches in diameter, the drive wheels 33 will be within the label area by providing for the distance from the center of the collar 30 to the wheels 33 to be approximately 1¾ inches. In such a configuration, with three axles 32 at 120 degree intervals, the drive wheels 33 may be positioned so that there is no interference with movement of the tone arm of the record player.

In FIG. 4, there is shown an embodiment in which a pedestal member 52, in axial alignment with the spindle 50, covers the record label portion of the record 51 and extends upwardly through the collar 30, terminating just above the collar 30 in a horizontal surface 53 which is slightly lower than the upper surface of the step-down wheels 35. Thus the drive wheels 33 rest on the outer surfaces of the pedestal member 52 rather than on the record 51 itself. The purpose of the surface 53 of the pedestal 52 is to support a disc member, as described hereinafter. However, the present system 10 may also be employed without the pedestal 52, in which case the drive wheels 33 will rest directly on the phonograph record 51 and the horizontal surface 53 will not be available for supporting a disc member. As shown in FIG. 4, a reflective or transparent disc 60 is horizontally positioned on the upper surfaces of the step-down wheels 34 and a similar disc 61 is horizontally positioned on the upper surfaces of the step-down wheels 35, with the diameter of the disc 61 being slightly less than that of disc 60. If the pedestal 52 is employed, a disc 62 may be horizontally positioned on upper surface 53. If the pedestal 52 is not present, the disc 62 may be positioned directly on the record 51 beneath the collar 30, with a hole being provided in the center of the disc 62 to allow the disc 62 to fit over the spindle 50, and with the disc 62 being confined to the label area.

Figure 6:
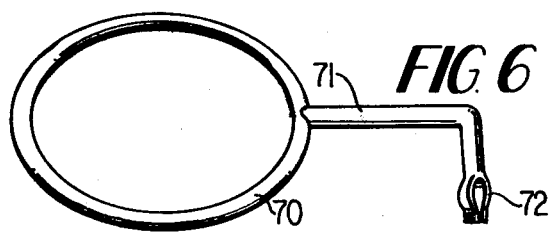
FIG. 6 is a perspective view of a stationary disc holder which may be employed with the projection system of the present invention.

In FIG. 6 there is shown a stationary disc holder ring 70 connected to arm 71, equipped at the end of the arm 71 with a pinch clamp 72 to allow the holder 70 to be attached directly to the differential speed ring arm 15 and thus to provide an additional location in axial alignment with the spindle 50 for positioning an additional transparent or reflective disc 63, as shown in FIG. 4. Each of the discs 60–63, however positioned, should be in axial alignment with the spindle 50 of the record player. In a case where other means for disc rotation is employed, the discs 60–63 should nevertheless be placed so that their axes are in vertical alignment.

Figure 7:
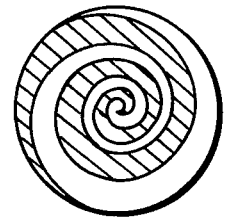
FIG. 7 is a plan view of one embodiment of a disc member which may be employed in the present invention.

As shown in FIGS. 7 through 12, the transparent or reflective disc member employed in the various positions as described herein may have any of various configurations. In FIG. 7, there is shown a disc having a so-called "psychoactive" pattern. Any of a number of such patterns containing optical illusions, Moreau patterns and the like may be employed. Some areas of the surface of the disc may be reflective while other surfaces are non-reflective. In FIG. 7, for example, the shaded area represents a non-reflective area of the disc surface. Reflective areas may be either white or colored light.

Figure 8:
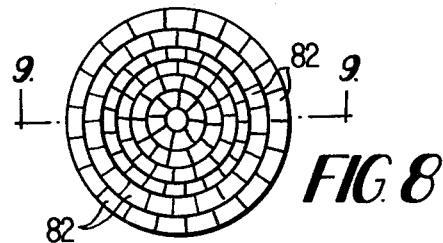
FIG. 8 is a plan view of a second embodiment of a disc member which may be employed in the present invention.
Figure 9:
FIG. 9 is a side elevation of the disc of FIG. 8.

In FIGS. 8 and 9, there is shown a faceted mirror disc in which a plurality of concentric tracks 80 are formed by a plurality of rings 81, with each ring 81 being composed of individual mirrored segments 82, and with the upper surfaces of the segments 82 which form each ring 81 lying in a different plane from the upper surfaces of the segments 82 of adjacent rings 81. The planes of the upper surfaces may be parallel as shown in FIG. 9 or, alternatively, in intersecting planes. Also, such mirrored facets or segments 82 may be placed on discs of various shapes.

Figure 10:
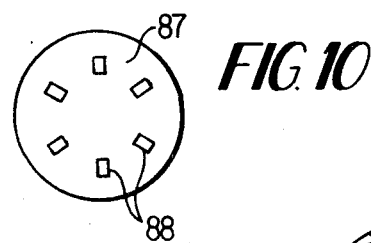
FIG. 10 is a plan view of a third embodiment of the disc member which may be employed in the present invention.
Figure 11:
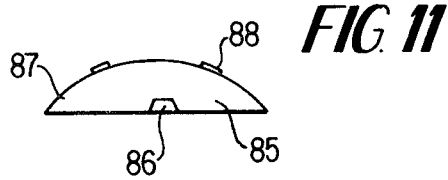
FIG. 11 is a side elevation of the disc of FIG. 10.

The disc shown in FIGS. 10 and 11 includes a molded base 85 of plastic or other material having a spindle hole 86 provided therein. A non-reflective material 87 such as black velvet, for example, is draped over the upper surface of the base 85 and is attached thereto by adhesive sealing material or other means. A reflective material 88 may then be adhered to portions of the non-reflective material 87 to produce the desired pattern. The molded base 85 may be formed in any of various shapes so as to create variations in the light pattern.

Figure 12:
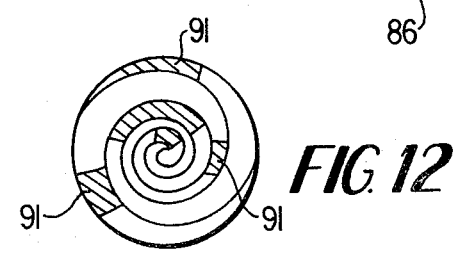
FIG. 12 is a plan view of a fourth embodiment of the disc member which may be employed in the present invention.

In FIG. 12, there is shown a disc having non-reflective areas 91 and with the remaining area of the disc surface being reflective. The disc of FIG. 12 is a "program" disc, for use such as with a binary reader. Although any of the other disc shown in FIGS. 7-11 could also be used with a binary reader, the particular pattern shown for the disc of FIG. 12 would provide the tight structuring of a binary code. In such a disc, the duration of the on/off time is controlled by the respective length of the reflective and non-reflective areas.

The discs shown in FIGS. 7-12 may also be constructed with transparent sections with, for example, the shaded portions representing a transparent area of one color, while the unshaded areas are also transparent but of a different color. Furthermore, transparent, reflective and non-reflective areas may be interspersed on the same disc.

In the operation of the light reflective projection system 10 of the present invention, the light source 20 and lens 26 are positioned above the differential speed ring collar 30 so that light rays from the light source 20 will be projected downwardly through one or more of the discs 60-63, thence upwardly through the lens 26 and projected upon the viewing surface (not shown). As previously mentioned, the discs 60-63 should all be in axial alignment relative to the spindle 50 of the record player. Generally the light source 20 should be positioned so that light rays projected downwardly toward the center of the label portion of the record will be at an angle of about 5 to 60 degrees, preferably about 5 to 45 degrees, relative to the vertical axis of the spindle 50. The lens 26 should be positioned at a similar angle on the opposite side of the spindle 50 axis to receive the upwardly reflected light rays. At angles of greater than about 60 degrees, the light intensity is undesirably reduced, while angles of less than about 5 degrees result in overlap between the light source 20 and the lens 26.

One or more discs 60-63 are placed in position as previously described, bearing in mind that the lowermost disc should be reflective in order to reflect the light rays upwardly, while discs located above the lowermost disc should be totally or at least partially transparent in order to allow passage of light therethrough.

As the rotatable portion 41 of the base 40 begins to rotate about its vertical axis, due to operation of the "on" switch of the record player, for example, the discs located in positions 60, 61 and 62 will begin to rotate. If the pedestal 52 is not present and a disc is located directly on the record 51 itself, this disc will also rotate. A disc 62 on the pedestal 52 or a disc located directly on the record will, of course, rotate at the speed of rotation of the record 51, such as 33⅓ r.p.m., for example. As the record 51 rotates, the drive wheels 33, bearing upon the label surface of the record 51, will also rotate, with the result that the discs 60 and 61, resting upon the upper surfaces of step-down wheels 34 and 35, will rotate at a slower speed and in the opposite direction to that of the record 51. In one embodiment, wherein disc 60 had a diameter of 3½ inches and disc 61 had a diameter of 3 inches, and with the wheels 34 and 35 having dimensions in the range previously given, the discs 60 and 61 rotated at a rate of about 6 to 8 r.p.m., with the smaller disc 61 rotating at a slower speed than the larger disc 60.

Thus it can be seen that, as previously described, light rays will be projected downwardly from the light source 20, through or onto one or more rotating and/or stationary discs of reflective and/or transparent materials, thence upwardly through the lens 26 to be projected onto the screen or other viewing surface. The light pattern which is obtained on the viewing surface will therefore be determined by such variables as: (1) the form, color and selective masking of the discs; (2) variations in speed and direction of rotation of the discs; (3) the number of disc employed and their location; (4) the distance and angle of the light source and lens relative to the discs; (5) the distance of the viewing surface from the lens; and (6) the particular lens or pattern of lenses employed.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely preferred embodiments thereof.

It is claimed:

1. A light reflective projection system which is capable of producing high resolution, colored, dynamic images, comprising: a support base member having means for rotating at least a portion thereof about a vertical axis; a light source and a lens mounted above said support base, said light source and said lens being positioned at equal angles on opposite sides of the vertical axis of said rotatable base portion; a plurality of stepping wheel devices mounted in a common horizontal plane above said support base, each stepping wheel device including a rotatable, upright drive wheel which rests upon the rotatable base portion and at least one step-down wheel mounted interiorly of each drive wheel, each step-down wheel having a smaller diameter than the respective drive wheel, and at least one disc supported in a horizontal position by said stepping wheel devices so that rotation of said rotatable base portion causes rotation of said drive wheels which, in turn, causes rotation of said disc about its vertical axis.

2. The projection system of claim 1 wherein the rotatable portion of said base comprises the turntable of a record player.

3. The projection system of claim 2 wherein a record is carried by said turntable and wherein the drive wheels contact said record within the record label area.

4. The projection system of claim 1 wherein a pedestal base member with horizontal upper surface for receiving a disc is mounted on the rotatable base portion for rotation therewith, said pedestal base extending upwardly and having a common vertical axis with the rotatable base portion.

5. The projection system of claim 1 wherein said lens and said light source are located at respective angles of from about 5 degrees to about 60 degrees relative to the axis of rotation of the rotatable portion of said base.

6. The projection system of claim 1, further including means for supporting a disc in a stationary position above the axis of rotation of said rotatable base portion.

* * * * *